United States Patent Office 3,353,862
Patented Nov. 21, 1967

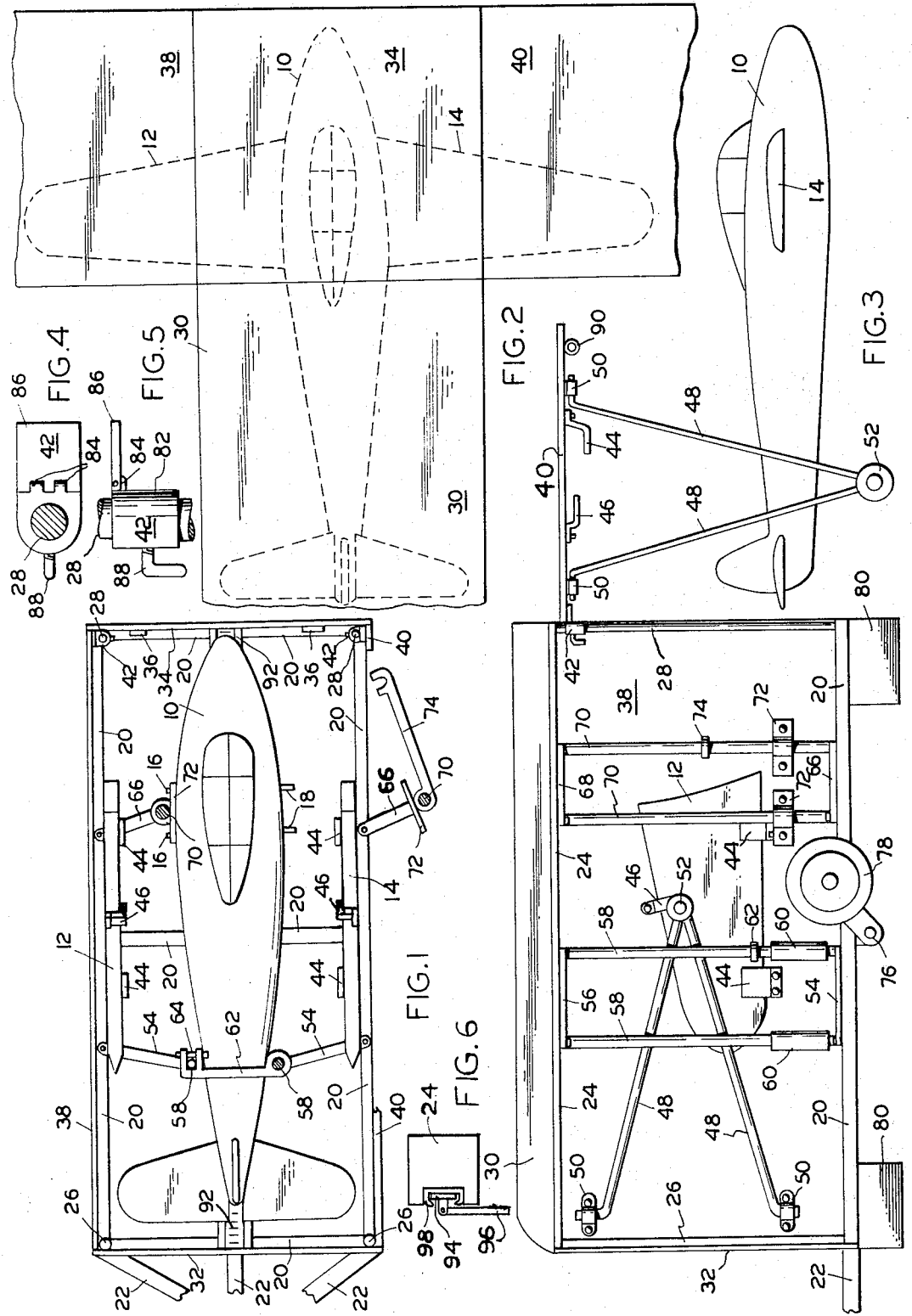

3,353,862
TRAILER
Hans H. Tormolen, 3142 Sumter, Dallas, Tex. 75220
Filed Nov. 18, 1964, Ser. No. 412,047
11 Claims. (Cl. 296—26)

The present invention relates to trailers adapted to be drawn by a road vehicle. In a more specific aspect, the present invention relates to a trailer adapted to transport aircraft. In a still more specific aspect, the present invention relates to a trailer adapted to transport aircraft and serve as a hanger for such aircraft at a temporary operating base.

In the utilization of small aircraft it is at times desirable to transport the aircraft to a temporary base of operation. It is also highly desirable to be able to provide temporary shelter or hanger facilities for the aircraft at such temporary base of operation. This is particularly true where a small aircraft is utilized for crop dusting or other such purposes where permanent hanger facilities are not available but the aircraft is based at a particular location for an extended period of time. Transport by a road vehicle and the provision of temporary shelter or the utilization of the trailer for other purposes at a given location is even more desirable when utilizing glider-type aircraft. Since such aircraft do not have their own motive power and a number of such aircraft usually operate from a given base where a tow plane is available, the provision of a trailer for transporting the craft and for temporary protection from the elements is highly desirable.

It is therefore an object of the present invention to provide an improved trailer adapted to be drawn by a road vehicle.

Another object of the present invention is to provide an improved trailer adapted to be drawn by a road vehicle wherein the sides of the trailer are adapted to be swung to a horizontal position.

A further object of the present invention is to provide a trailer adapted to be drawn by a road vehicle wherein the two sides and one end of the trailer are adapted to be swung to a horizontal position.

Another and further object of the present invention is to provide a trailer adapted to be drawn by a road vehicle wherein certain walls of the trailer may be swung to a position in which they serve as a temporary roof.

Still another object of the present invention is to provide a trailer adapted to be drawn by a road vehicle wherein certain walls of the trailer may be swung into a position where they form a generally T-shaped roof and serve as a temporary hanger for small aircraft.

A further object of the present invention is to provide a trailer adapted to be drawn by a road vehicle wherein a small aircraft can be conveniently transported.

Yet another object of the present invention is to provide an improved trailer adapted to be drawn by a road vehicle wherein at least two rotatable clamps are adapted to clamp against the sides of an object being transported in the trailer.

A further object of the present invention is to provide a trailer adapted to be drawn by a road vehicle wherein swingable clamp means are adapted to clamp against the sides of a small aircraft fuselage being transported in the trailer.

These and other objects of the present invention will be apparent from the following detailed description when read in conjunction with the drawings, wherein:

FIGURE 1 is a plan view, partially in section, of the trailer of the present invention with the roof of the trailer removed;

FIGURE 2 is also a plan view, partially in section, of the trailer of the present invention with its walls in position to serve as a temporary shelter;

FIGURE 3 is an elevational view, partially in section, of the trailer of the present invention with one end and one wall in a horizontal plane;

FIGURE 4 is a plan view, partially in section, of a pivotal hinge adapted to be attached to a wall of the trailer of the present invention;

FIGURE 5 is a side view of the pivotal hinge of FIGURE 4;

FIGURE 6 is a view of a slide-type hinge.

In accordance with the present invention, a trailer is provided in which the side walls are adapted to be swung upwardly to a horizontal plane and then pivoted rearwardly where they serve as a temporary roof structure. The rear end wall can also be adapted to swing upwardly so that in cooperation with the side walls a broad roof structure is provided at the end of the trailer and a T-shaped roof is formed by this structure in combination with the main roof of the trailer. The present invention also provides a trailer in which clamping means are adapted to swing inwardly from either side of the trailer to clamp against an object being transported in the trailer. The details of the present invention are quite apparent when reference is made to the drawings.

In the drawings, the numeral 10 designates the fuselage of an aircraft which may be transported by the trailer of this invention and also stored in the temporary hangar provided by the trailer of the present invention. Extending from fuselage 10 are wings 12 and 14, respectively. Wings 12 and 14 are detachably mounted on fuselage 10 by conventional means as, for example, bolts 16 and 18, respectively. The aircraft 10–12–14 is of course conventional, and is referred to herein only to illustrate the advantages of the trailer of the present invention when utilized to transport and hangar small aircraft. In the present instance, the aircraft shown is a glider-type craft.

The trailer of the present invention is a generally rectangular, elongated trailer having a bottom frame section 20 to which is attached a conventional trailer hitch 22 at the front end thereof. Top frame section 24 is mounted atop front upright support posts 26 which are shown to be cylindrical posts and rear upright support posts 28, of similar structure. Mounted on upper frame section 24 and covering the entire trailer is roof member 30. The trailer also includes front end wall 32. Rear end wall 34 is attached to top frame section 24 by means of strap-type hinges 36, or other suitable means, which permit rear end wall 34 to be swung upwardly to a horizontal plane. Side walls 38 and 40, respectively, enclose the sides of the trailer. As will be pointed out in more detail hereinafter, side walls 38 and 40 are fixedly attached to pivotal hinge members 42, which, in turn, are slideably mounted on rear posts 28. Mounted on the interior of side walls 38 and 40, adjacent the lower portion thereof, are brackets 44 which are adapted to receive and hold wings 12 and 14. Also mounted on the interior of side walls 38 and 40 is rotatable bracket 46, which is positioned adjacent the upper portion of the walls and is adapted to swing over the top of the wings and hold the wings in position on the side walls. Other appropriate clamping means can obviously be supplied, it only being necessary that clamps be provided for holding the wings of the aircraft during transport of the craft. Also attached to the inside of walls 38 and 40 near the front end of the walls are support legs 48. Support legs 48 are shown to be pivotally mounted on side walls 38 and 40 by means of appropriate brackets 50. It should be understood, however, that side walls 38 and 40 may be extended forwardly of front wall 32 of the trailer and support legs 48 may be fixedly attached to walls 38 and 40 perpendicular to the wall and in advance of front wall 32 so that, when side walls 38 and 40 are folded against the sides of the trailer, support legs 48 will clear the front wall 32 of the trailer and thus fold across the front. Support legs 48 have mounted on the bottom free end thereof wheels 52. Wheels 52 improve the maneuverability of side walls 38 and 40. It is obvious that if side walls 38 or 40 are swung upwardly to a horizontal plane and support legs 48 are turned down perpendicular to the side walls, the side wall may then be rotated toward the rear of the trailer with the aid of wheels 52. Pivotally mounted on bottom frame section 20 are bars 54. Corresponding bars 56 are rotatably attached to upper frame 24. Joining the free ends of bars 54 and 56 are upright clamping posts 58. It is to be observed that upright clamping posts 58 may be rotated 360° when walls 38 and 40 are open, and are free to rotate through 180° when walls 38 and 40 are closed. In any event, clamping bars 58 may rotate as little as 90° and still serve the dual purpose of providing support for the trailer frame and also to clamp against fuselage 10 near the tail end thereof. In order to aid in the tight clamping of the fuselage tail section between clamping posts 58, annular rubber sleeves 60 are mounted on clamping posts 58. In addition, an appropriate cross-tie bar 62 may be provided which is rotatable on one of clamping posts 58 to engage the opposing clamping post and be locked thereto, as by means of bolt 64 or like means. Similar rotatable bars 66 are mounted on bottom frame section 20 near the rear end of the trailer and corresponding rotatable bars 68 are mounted on top frame section 24. Bars 66 and 68 are rotatable in the same manner as bars 54 and 56. Joining the free ends of bars 56 and 58 are upright clamping posts 70. Clamping posts 70 carry clamping plates 72 which are adapted to fit wing bolts 16 and 18 on fuselage 10. It is to be observed that by tying plates 72 to fuselage 10 by means of wing bolts 16 and 18, the front end of fuselage 10 can be rigidly supported. In addition, clamp posts 70 also serve as structural supports for the trailer in much the same manner as clamp bars 58. Mounted on one of clamp posts 70 is cross-tie bar 74 which is adapted to engage the opposing clamp post 70 and lock the two clamp posts together, thus providing additional rigidity. Mounted on axle 76 on the bottom of the trailer are running wheels 78. As shown in FIGURE 3, running wheels 78 are adapted to rotate on axle 76 and be locked either in a downward position supporting the trailer, or in the upward position shown in the drawing. These two positions of wheels 78 further increase the utility of the trailer. When the trailer is at a location where it is to be utilized to hangar an aircraft, the wheels 78 are preferably locked in their up position and the trailer mounted on support blocks 80. Support blocks 80 may, of course, be any appropriate temporary support.

FIGURES 4 and 5 illustrate a rudimentary rotatable hinge 42 which is fixedly attached to the upper end of side walls 38 and 40 and permits the side walls to be swung upwardly to a horizontal plane and then rotated rearwardly toward the end of the trailer. Thus rotatable hinge 42 may comprise an annular sleeve portion 82 which is slideably mounted on upright support 28. Attached to sleeve section 82 through lugs 84 is a strap-type hinge portion 86 which is fixedly attached to the upper rear corner of side walls 38 or 40. Sleeve portion 82 of hinge 42 may be clamped to support 28 by appropriate bent handle-type set screws 88. By loosening screw, walls 38 and 40 may be rotated toward the rear of the trailer. In addition, sleeve 82 is also adapted to slide up and down on support 28 and accordingly side walls 38 and 40 may be lowered to a position opposite fuselage 10 and thereby facilitate the assembly and disassembly of wings 12 and 14.

It is obvious that a number of variations and modifications of the present invention will occur to one skilled in the art. For example, when the trailer has been expanded to the form in which it serves as a hangar for an aircraft, or a roof structure for other purposes, the sides of the trailer itself or any of the open side walls 38 and 40 and rear end wall 34 may be provided with appropriate canvas or plastic curtains or screens to provide additional protection from the elements. To illustrate this, a roll of canvas 90 which can be unrolled is shown attached to side wall section 40. Appropriate support channels for plane fuselage 10 can also be provided as shown by channel 92 in FIGURE 1. Whether additional curtains or canvas, such as, 90, are employed, the walls of the trailer itself and even roof 30 can be covered with canvas or plastic, or more permanent wall structures can be made from aluminum, other metals or wood. It should be also recognized that side walls 38 and 40 can be slideably mounted to vary the basic shape of the open structure. For example, side walls 38 and 40 may be attached to upper frame section 24 by a slideable hinge as illustrated in FIGURE 6. According to FIGURE 6, a suitable channel 98 is attached along frame section 24. A plurality of slides 94 fit into and slide in channel 98 and strap-type hinges 96 are pivotally attached to slides 94. By attaching slides similar to 94 to the rearward edge of walls 38 and 40, the walls may be swung to a horizontal plane and rotated toward the rear, as previously discussed. Thereafter, the slides may be inserted in channel 98 and the wall slid toward the forward end of the trailer. Likewise, slide-type hinges as in FIGURE 6 can be mounted on end wall 34, or for that matter end wall 32 can be so mounted also, and a channel such as 98 mounted on either the bottom edges or the ends or both of walls 38 and 40 and the end wall 34 or 34 and 32 can be slid along the edge of these side walls when they are in the open position. Appropriate latches or bolts with wing nuts or other fastening devices known to those skilled in the art may be utilized to latch the walls in their closed or open positions. Other such variations and modifications are obvious and accordingly the present invention is to be limited only by the appended claims.

I claim:
1. A trailer adapted to be drawn by a road vehicle, comprising:
 (a) a box-like frame structure, including, a floor frame, open-structure side and end frames attached to said floor frame and extending upwardly therefrom and a roof frame attached to the tops of said side and end frames;
 (b) a roof structure adapted to cover the top of said frame;
 (c) side and end walls adapted to cover the side and end frames, said side walls being single, unitary wall structures releasably attached to their corresponding side frames when in a covering position; and
 (d) at least one dual-motion, coupling means coupling said side walls to the top of their corresponding side frames and including a vertically-movable pivot element adapted to swing said side walls upwardly into a horizontal plane and a laterally-movable element adapted to move said side walls laterally with respect to said frame.

2. A trailer in accordance with claim 1 which additionally includes support means attached to the side walls to support said side walls in a horizontal plane.

3. A trailer in accordance with claim 2 wherein the support means includes a wheel on its lower free end.

4. A trailer in accordance with claim 2 wherein the support means is pivotally mounted on the side wall and swings from a position generally parallel to said side wall to a position perpendicular to said side wall.

5. A trailer in accordance with claim 1 which additionally includes pivot means coupling an end wall to the top of the corresponding end frame on that end of said frame toward which the side walls move and adapted to swing upwardly into a horizontal plane.

6. A trailer in accordance with claim 1 which additionally includes at least one pair of opposing clamp means mounted on the sides of said frame structure; and pivot means connecting said clamp means to said frame structure to pivot said clamp means inwardly to a clamping position against the sides of an object being transported by said trailer.

7. A trailer in accordance with claim 1 wherein the laterally-movable element of the dual-motion coupling means is a pivot element.

8. A trailer in accordance with claim 1 wherein the laterally-movable element of the dual-motion coupling means is a slide element.

9. A trailer in accordance with claim 6 wherein said clamp means extends from the top of said frame to the bottom thereof and serves as an upright support for a part of said trailer.

10. A trailer in accordance with claim 6 wherein the clamp means includes latch means for latching the opposing clamp means to one another in clamping engagement against the sides of the object being transported by the trailer.

11. A trailer in accordance with claim 6 wherein the wheels of said trailer are foldable upwardly to permit the trailer to rest on rigid, semi-permanent supports.

References Cited

UNITED STATES PATENTS

| 617,623 | 1/1899 | Young | 105—369 |
| 803,707 | 11/1905 | Osel | 49—201 |
| 1,813,269 | 7/1931 | Barrett | 105—369 |
| 2,006,477 | 7/1935 | Pendry | 52—68 |
| 3,200,772 | 8/1965 | Moorhead | 105—369 |

FOREIGN PATENTS 1,028,739  2/1953  France.

BENJAMIN HERSH, *Primary Examiner.*

P. GOODMAN, *Assistant Examiner.*